United States Patent
Rais-Ghasem et al.

(10) Patent No.: US 10,002,179 B2
(45) Date of Patent: Jun. 19, 2018

(54) DETECTION AND CREATION OF APPROPRIATE ROW CONCEPT DURING AUTOMATED MODEL GENERATION

(71) Applicant: International Business Machines Corporation, Armonk, NY (US)

(72) Inventors: Mohsen Rais-Ghasem, Ottawa (CA); Graham A. Watts, Ottawa (CA); Qing Wei, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 14/610,812

(22) Filed: Jan. 30, 2015

(65) Prior Publication Data
US 2016/0224653 A1    Aug. 4, 2016

(51) Int. Cl.
*G06F 17/30*    (2006.01)

(52) U.S. Cl.
CPC .. *G06F 17/30598* (2013.01); *G06F 17/30294* (2013.01)

(58) Field of Classification Search
CPC ................................................ G06F 17/30598
USPC ........................................................ 707/740
See application file for complete search history.

(56) References Cited

U.S. PATENT DOCUMENTS

| | | | |
|---|---|---|---|
| 5,842,213 A | 11/1998 | Odom et al. | |
| 6,052,656 A | 4/2000 | Suda et al. | |
| 6,108,004 A * | 8/2000 | Medl | G06F 3/0482 706/46 |
| 6,199,034 B1 | 3/2001 | Wical | |
| 6,289,500 B1 | 9/2001 | Baxter et al. | |
| 6,424,973 B1 | 7/2002 | Baclawski | |
| 7,499,944 B2 | 3/2009 | Higuchi | |
| 7,502,779 B2 | 3/2009 | Brockway et al. | |
| 7,562,074 B2 | 7/2009 | Liddell et al. | |
| 7,734,659 B2 | 6/2010 | Lori | |

(Continued)

FOREIGN PATENT DOCUMENTS

| | | |
|---|---|---|
| CN | 101196900 A | 6/2008 |
| CN | 101286151 A | 10/2008 |

(Continued)

OTHER PUBLICATIONS

Response to the Final Office Action dated Jun. 13, 2016, from U.S. Appl. No. 13/844,587, filed Aug. 29, 2016, 7 pp.

(Continued)

*Primary Examiner* — Joshua Bullock
(74) *Attorney, Agent, or Firm* — Shumaker & Sieffert, P.A.

(57) ABSTRACT

A system and method for assigning concepts to sets of values. Data is received, wherein the data is organized as a plurality of named fields and as two or more sets of values associated with the named fields, wherein each named field is assigned to a category. For each category, determine whether there is at least one identifier field for that category, wherein each identifier field is a named field that acts as an identifier for that category, and identify identifier fields, if any, for each category that have a unique value in the identifier field for that category for each set of values. Then select one of the categories as a concept representing the sets of values. In some embodiments, the data is organized as a table, wherein the named fields are columns and the sets of values are rows.

9 Claims, 6 Drawing Sheets

(56) References Cited

U.S. PATENT DOCUMENTS

| | | |
|---|---|---|
| 7,739,104 B2 | 6/2010 | Berkan et al. |
| 7,774,288 B2 | 8/2010 | Acharya et al. |
| 7,899,810 B2 | 3/2011 | Cambot et al. |
| 8,019,758 B2 | 9/2011 | Zheng et al. |
| 8,099,382 B2 | 1/2012 | Liu et al. |
| 8,150,832 B2 | 4/2012 | Helfman |
| 8,175,911 B2 | 5/2012 | Cao et al. |
| 8,239,342 B2 | 8/2012 | Ross et al. |
| 8,266,148 B2 | 9/2012 | Guha et al. |
| 8,332,440 B2 | 12/2012 | Parker, III et al. |
| 8,452,804 B2 | 5/2013 | Bakalash et al. |
| 8,645,362 B1 | 2/2014 | Jain et al. |
| 8,977,953 B1 | 3/2015 | Pierre et al. |
| 8,996,555 B2 | 3/2015 | Kuchmann-Beauger et al. |
| 9,064,006 B2 | 6/2015 | Hakkani-Tur et al. |
| 2002/0016800 A1 | 2/2002 | Spivak et al. |
| 2003/0028541 A1 | 2/2003 | Bradley et al. |
| 2003/0088543 A1 | 5/2003 | Skeen et al. |
| 2003/0126147 A1 | 7/2003 | Essafi et al. |
| 2003/0221171 A1 | 11/2003 | Rust et al. |
| 2004/0024739 A1 | 2/2004 | Copperman et al. |
| 2005/0043940 A1 | 2/2005 | Elder |
| 2005/0278321 A1 | 12/2005 | Vailaya et al. |
| 2006/0024654 A1 | 2/2006 | Goodkovsky |
| 2006/0074980 A1 | 4/2006 | Sarkar |
| 2006/0106824 A1 | 5/2006 | Stuhec |
| 2006/0117002 A1 | 6/2006 | Swen |
| 2006/0179074 A1 | 8/2006 | Martin et al. |
| 2006/0288038 A1 | 12/2006 | Zheng et al. |
| 2007/0078889 A1 | 4/2007 | Hoskinson et al. |
| 2007/0088723 A1* | 4/2007 | Fish .................. G06Q 30/00 |
| 2007/0094060 A1 | 4/2007 | Apps et al. |
| 2007/0118551 A1 | 5/2007 | Akkiraju et al. |
| 2007/0174188 A1* | 7/2007 | Fish .................. G06Q 30/02 |
| | | 705/39 |
| 2008/0016039 A1 | 1/2008 | Brown et al. |
| 2008/0168135 A1 | 1/2008 | Redlich et al. |
| 2008/0059498 A1 | 3/2008 | Carus et al. |
| 2008/0097979 A1 | 4/2008 | Heidloff et al. |
| 2008/0189312 A1 | 8/2008 | Taranov et al. |
| 2008/0195604 A1 | 8/2008 | Sears |
| 2008/0270380 A1 | 10/2008 | Ohm et al. |
| 2009/0125463 A1 | 5/2009 | Hido |
| 2009/0172035 A1 | 7/2009 | Lessing et al. |
| 2009/0222476 A1 | 9/2009 | Williamson |
| 2009/0254847 A1 | 10/2009 | Counts et al. |
| 2009/0319544 A1 | 12/2009 | Griffin et al. |
| 2009/0327240 A1* | 12/2009 | Meehan ............ G06F 17/30554 |
| 2010/0049692 A1* | 2/2010 | Astito ............... G06F 17/30427 |
| | | 707/769 |
| 2010/0049766 A1 | 2/2010 | Sweeney et al. |
| 2010/0082691 A1 | 4/2010 | Jaster et al. |
| 2010/0199223 A1 | 8/2010 | Colner |
| 2010/0202698 A1 | 8/2010 | Schmidtler et al. |
| 2010/0287014 A1 | 11/2010 | Gaulin et al. |
| 2010/0325206 A1 | 12/2010 | Dayal et al. |
| 2011/0040552 A1 | 2/2011 | Van Guilder et al. |
| 2011/0072021 A1 | 3/2011 | Lu et al. |
| 2011/0087629 A1 | 4/2011 | B'Far et al. |
| 2011/0093469 A1 | 4/2011 | B'Far et al. |
| 2011/0138312 A1 | 6/2011 | Yeh et al. |
| 2011/0153611 A1 | 6/2011 | Ankisettipalli et al. |
| 2011/0258202 A1 | 10/2011 | Mukherjee et al. |
| 2011/0307485 A1 | 12/2011 | Udupa et al. |
| 2011/0320396 A1 | 12/2011 | Hunt et al. |
| 2012/0078926 A1 | 3/2012 | Chu-Carroll et al. |
| 2012/0089636 A1 | 4/2012 | Qayyum et al. |
| 2012/0102032 A1 | 4/2012 | Bryne et al. |
| 2012/0143780 A1 | 6/2012 | Adendorff et al. |
| 2012/0154402 A1 | 6/2012 | Mital et al. |
| 2012/0179710 A1 | 7/2012 | Hanai |
| 2012/0197936 A1 | 8/2012 | Fuchs |
| 2012/0290561 A1 | 11/2012 | Kobayashi et al. |
| 2012/0310628 A1 | 12/2012 | Rathod et al. |
| 2013/0117253 A1 | 5/2013 | Wang et al. |
| 2013/0173507 A1 | 7/2013 | Chmiel et al. |
| 2013/0205190 A1 | 8/2013 | Kossmann et al. |
| 2013/0246430 A1 | 9/2013 | Szucs et al. |
| 2013/0268554 A1 | 10/2013 | Kokubu et al. |
| 2013/0300743 A1 | 11/2013 | Degrell et al. |
| 2014/0095145 A1 | 4/2014 | Assulin et al. |
| 2014/0114902 A1 | 4/2014 | McClung et al. |
| 2014/0164362 A1 | 6/2014 | Syed et al. |
| 2014/0164379 A1 | 6/2014 | Jojgov et al. |
| 2014/0278364 A1 | 9/2014 | Grosset et al. |
| 2014/0279677 A1 | 9/2014 | Grosset et al. |
| 2014/0379755 A1 | 12/2014 | Kuriakose et al. |
| 2015/0006160 A1 | 1/2015 | Grosset et al. |
| 2015/0006432 A1 | 1/2015 | Grosset et al. |
| 2015/0026153 A1 | 1/2015 | Gupta et al. |
| 2015/0032707 A1 | 1/2015 | Barykin et al. |
| 2015/0066945 A1* | 3/2015 | Crowe .............. G06F 17/30011 |
| | | 707/741 |
| 2015/0186776 A1 | 7/2015 | Petitclerc et al. |
| 2015/0186808 A1 | 7/2015 | Petitclerc et al. |
| 2015/0278198 A1 | 10/2015 | Andreev |
| 2015/0317374 A1 | 11/2015 | Petitclerc et al. |
| 2015/0317573 A1 | 11/2015 | Petitclerc et al. |
| 2015/0339369 A1 | 11/2015 | Rais-Ghasem et al. |

FOREIGN PATENT DOCUMENTS

| | | |
|---|---|---|
| EP | 2073131 A1 | 6/2009 |
| WO | 0046701 A1 | 8/2000 |
| WO | 2007005378 A2 | 1/2007 |
| WO | 2008100849 A2 | 8/2008 |
| WO | 2009094290 A2 | 7/2009 |
| WO | 2012085518 A1 | 6/2012 |

OTHER PUBLICATIONS

Advisory Action from U.S. Appl. No. 13/844,587, dated Sep. 6, 2016, 5 pp.

Response to the Final Office Action dated Jun. 13, 2016 and the Advisory Action dated Sep. 6, 2016, from U.S. Appl. No. 13/844,587, filed Sep. 9, 2016, 15 pp.

Response to the Office Action dated Jun. 13, 2016, from U.S. Appl. No. 14/266,497, filed Sep. 12, 2016, 21 pp.

Fileto et al., "Baquara: A Holistic Ontological Framework for Movement Analysis Using Linked Data," adfa, 2011. (Applicant points out, in accordance with MPEP 609.04(a), that the year of publication, 2011, is sufficiently earlier than the effective U.S. filed, Jan. 30, 2015, so that the particular month of publication is not in issue.) Springer-Verlag Berlin Heidelberg, p. 1-14.

Response to the Office Action dated Nov. 18, 2016, from U.S. Appl. No. 14/141,950 filed Feb. 1, 2017, 14 pp.

Final Office Action from U.S. Appl. No. 13/844,587, dated Jun. 13, 2016, 26 pp.

Office Action from U.S. Appl. No. 14/266,497, dated Jun. 13, 2016, 30 pp.

U.S. Appl. No. 15/055,382, filed Feb. 26, 2016 by Mohsen Rais-Ghasem et al.

"Automated Ontological Mapping for Metadata," IP.com Prior Art Database Technical Disclosure: IPCOM000191276D, Dec. 24, 2009, 2 pp.

"Method and System for Dynamically Creating Business Intelligence Reports and Dashboards based on User Inputs," IP.com Prior Art Database Technical Disclosure: IPCOM000202424D, Dec. 15, 2010, 6 pp.

"Method for Determining Explanatory Factors for a Selection of Aggregated Data," IP.com Prior Art Database Technical Disclosure: IPCOM000225183D. Jan. 29, 2013, 6 pp.

"Method and System for Automatically Determining Hierarchies/ Relationships from a Data Set for Generating Data Model," IP.com Prior Art Database Technical Disclosure: IPCOM000202401D, Dec. 15, 2010, 5 pp.

Cao et al., "Ontology-based Integration of Business Intelligence," Web Intelligence and Agent Systems, retrieved from http://www-staff.it.uts.edu.au/~lbcao/publication/W639.pdf, Dec. 6, 2006, 13 pp.

(56) References Cited

OTHER PUBLICATIONS

Cheng et al., "An Ontology-Based Business Intelligence Application in a Financial Knowledge Management System," Expert Systems with Applications, Elsevier Ltd., Mar. 4, 2008, 9 pp.
Egozi et al., "Concept-Based Information Retrieval using Explicit Semantic Analysis," ACM Transactions on Information Systems, vol. 29, No. 2, Apr. 2011, 38 pp.
Hofmann, "Latent Semantic Models for Collaborative Filtering," ACM Transactions on Information Systems, vol. 22, No. 1, Jan. 2004, 27 pp.
Kishore et al., "Probabilistic Semantic Web Mining Using Artificial Neural Analysis," International Journal of Computer Science and Information Security, vol. 7, No. 3, Mar. 2010, 11 pp.
Mustapha et al., "Knowledge Harvesting for Business Intelligence," Second European Business Intelligence Summer School (eBISS 2012), Jul. 15-21, 2012, 144 pp.
Neumayr et al., "Semantic Cockpit: An Ontology-driven. Interactive BI Tool for Comparative Data Analysis," The 1st International Workshop on Modeling and Reasoning for Business Intelligence (MoRe-BI 2011), Oct. 31, 2011, 20 pp.
Rais-Ghasem et al., "Towards Semantic Data Analysis," CASCON 2013, Nov. 18-20, 2013, 12 pp.
Rais-Ghasem et al., "Towards Semantic Data Analysis," IBM Canada Ltd., Nov. 18-20, 2013, 8 pp.
Saggion et al., "Ontology-based Information Extraction for Business Intelligence," Proceedings of the 6th International Semantic Web Conference, ISWC'07/ASWC'07, Nov. 11, 2007, 14 pp.
Sell et al., "SBI: A Semantic Framework to Support Business Intelligence," OBI'08, Oct. 2008, 11 pp.
Van Ham et al., "Guiding Multidimensional Analysis Using Decision Trees," IBM Canada Ltd., Proceedings of the 2013 Conference of the Center for Advanced Studies on Collaborative Research, Nov. 18, 2013, 15 pp.
Zarandi, "A Retail Ontology: Formal Semantics and Efficient Implementation," University of Toronto, Master of Science Thesis, 2007, 180 pp.
"The Chado Approach," Chapter 1. Introduction, retrieved from http://papio.biology.duke.edu/babase_chado_html/the-chado-approach.html on Jan. 8, 2015, 1 pp.
Han et al., "RDF123: a mechanism to transform spreadsheets to RDF," UMBC ebiquity, Aug. 26, 2007, 19 pp.
Syed et al., "Exploiting a Web of Semantic Data for Interpreting Tables," UMBC ebiquity, Second Web Science Conference, Apr. 26-27, 2010, 8 pp.
U.S. Appl. No. 14/266,497, by Martin Petitclerc et al., filed Apr. 30, 2014.
U.S. Appl. No. 14/285,269, by Mohsen M. Rais-Ghasem et al., filed May 22, 2014.
U.S. Appl. No. 14/141,950, by Martin Petitclerc et al., filed Dec. 27, 2013.
U.S. Appl. No. 14/309,408, by Martin Petitclerc et al., filed Jun. 19, 2014.
"List of IBM Patents or Patent Applications Treated as Related," Appendix P, 2 pp.
U.S. Appl. No. 13/844,612, by Robin N. Grosset et al., filed Mar. 15, 2011.
Fei Li et al., "Constructing an Interactive Natural Language Interface for Relational Databases," Proceedings of the VLDB Endowment, vol. 8, No. 1, Sep. 1, 2014, 12 pp.
Rukshan Alexander et al., "Natural Language Web Interface for Database (NLWIDB)," Proceedings of the Third International Symposium, SEUSL: Jul. 6-7, 2013, 8 pp.
Prosecution History from U.S. Appl. No. 13/844,587 from Sep. 17, 2014 through May 2, 2016 109 pgs.
Preliminary Amendment from U.S. Appl. No. 14/266,497, filed Feb. 24, 2015.
Preliminary Amendment from U.S. Appl. No. 14/141,950, filed Jun. 19, 2014 5 pgs.
U.S. Appl. No. 14/839,701, filed Aug. 28, 2015 by Mohsen Rais Ghasem et al.
Office Action from U.S. Appl. No. 13/844,587, dated Nov. 16, 2016, 28 pp.
Office Action from U.S. Appl. No. 14/489,251, dated Nov. 14, 2016, 23 pp.
Final Office Action from U.S. Appl. No. 14/266,497, dated Dec. 12, 2016, 52 pp.
Office Action from U.S. Appl. No. 14/141,950, dated Nov. 18, 2016, 19 pp.
Amendment in Response to Office Action dated Apr. 4, 2017, from U.S. Appl. No. 15/055,382, filed Aug. 7, 2017, 11 pp.
Office Action from U.S. Appl. No. 15/055,382, dated Apr. 4, 2017, 12 pp.
Office Action, from counterpart Chinese Application No. 20160058931.6, dated Mar. 20, 2018, 7 pp.
Notice of Allowance from U.S. Appl. No. 15/055,382, dated Mar. 5, 2018, 8 pp.

* cited by examiner

| Title | Year | Season | Studio | Genre | Rotten Tomatoes % | Box Office Avg | Budget | Net Profit | Opening Weekend |
|---|---|---|---|---|---|---|---|---|---|
| The Hills Have Eyes 2 | 2007 | Winter | Independent | Horror | 11 | 3258 | 15 | 22.47 | 9.7 |
| American Gangster | 2007 | Winter | Universal | Thriller | 79 | 14284 | 100 | 187.9 | 43.6 |
| Hitman | 2007 | Winter | Fox | Action | 15 | 5362 | 17.5 | 82.48 | 13.2 |
| Saw IV | 2007 | Winter | Independent | Horror | 18 | 9976 | 10 | 129.35 | 31.7 |
| Into the Wild | 2007 | Winter | Paramount | Drama | 82 | 3249 | 15 | 40.63 | 2.1 |
| Smokin' Aces | 2007 | Winter | Universal | Action | 27 | 6599 | 17 | 40.1 | 14.6 |

FIG. 5

DETECTION AND CREATION OF APPROPRIATE ROW CONCEPT DURING AUTOMATED MODEL GENERATION

BACKGROUND

The present invention relates to natural language analytics, and more specifically, to the classification of data in a dataset.

It can be difficult to accurately convert tabular data into a useful query model. Typically, expert modeling of the data is required, and the analytic tools needed to do the conversion typically require training and expertise that is not common among business users.

Of course there are many challenges with creating such tools. If the automatic modeling is not reflective of the data or the knowledge it represents, then the queries that it can produce are not very useful in answering the user's questions. If the user's question cannot be parsed and understood by the system, then the system cannot accurately produce a query to answer their question. Accurate natural language parsing has been a branch of computer science for over 50 years, and is still considered in its infancy.

In traditional analytics systems, there is a modeling phase where an experienced modeler would have specifically exposed the rows (if they have meaning in the data) as an element in the model, often by adding a derived attribute. But this is done by a person who understands the data they are modeling, and takes time. Systems like Watson Analytics specifically do away with the modeling step, or at least make it optional, to improve time to value for the user.

Other systems have taken a more pragmatic approach to both the modeling and natural language challenges by specifically doing away with the modeling step, or at least making it optional, in order to improve time to value for the user. Under some such systems, the natural language parsing consists of matching words to elements in the model, or analysis types, and ignoring the other words in the sentence. The modeling is also very lightweight, producing a single table (usually within a columnar database) which matches the user's original data, but with extra metadata describing what the system thinks the various columns represent. This is done for each column since the columns contain a label that is easy to look up in a classification system, as well as a set of data values that are usually representative of the concept of the column. As such the columns themselves become the query elements that can be matched to the user's questions in order to produce answers.

SUMMARY

According to an embodiment of the present invention, a method comprises receiving data, wherein the data is organized as a plurality of named fields and as two or more sets of values associated with the named fields, wherein each named field is assigned to a category; determining, for each category, whether there is at least one identifier field for that category, wherein each identifier field is a named field that acts as an identifier for that category; identifying, for each category, identifier fields, if any, for that category that have a unique value in the identifier field for that category for each set of values; and selecting one of the categories as a concept representing the sets of values. In some embodiments, the data is organized as a table, wherein the named fields are columns and the sets of values are rows. An advantage of this approach is that the classifying of rows or other such sets of values can be done by the system automatically, and does not require intervention by a modeler or other end user, therefore producing a better zero modeling experience for a user.

According to one embodiment of the present invention, a computer program product for comparative peer analysis for business intelligence (BI) is described. The computer program product comprises a computer-readable storage medium having program code embodied therewith, the program code executable by at least one processing device to receive data, wherein the data is organized as a plurality of named fields and as two or more sets of values associated with the named fields, wherein each named field is assigned to a category, determine, for each category, whether there is at least one identifier field for that category, wherein each identifier field is a named field that acts as an identifier for that category, identify, for each category, identifier fields, if any, for that category that have a unique value in the identifier field for that category for each set of values, and select one of the categories as a concept representing the sets of values. In some embodiments, selecting includes selecting a category that includes an identifier field with a unique value in the identifier field for that category for each set of values. As noted above, an advantage of this approach is that the classifying of rows or other such sets of values can be done by the system automatically, and does not require intervention by a modeler or other end user, therefore producing a better zero modeling experience for a user.

According to another aspect of the present invention, a system is describe, comprising a network, a business intelligence system and one or more computing devices connected through the network to the business intelligence system. The business intelligence system receives data, wherein the data is organized as a plurality of named fields and as two or more sets of values associated with the named fields, wherein each named field is assigned to a category. The business intelligence system includes a dataset analytics tool, wherein the dataset analytics tool receives the data, determines, for each category, whether there is at least one identifier field for that category, wherein each identifier field is a named field that acts as an identifier for that category, identifies, for each category, identifier fields, if any, for that category that have a unique value in the identifier field for that category for each set of values, and selects one of the categories as a concept representing the sets of values. An advantage of this approach is that the system can classify rows or other such sets of values automatically, and does not require intervention by a modeler or other end user, therefore producing a better zero modeling experience for a user.

According to yet another aspect of the present invention, data is organized as a table, where the named fields are columns and the sets of values are rows, and selecting includes selecting a category that includes an identifier field with a unique value in the identifier field for that category for each set of values. This approach is advantageous because it allows one to use an aspect of the invention with tabular data.

In another aspect of the present invention, selecting includes selecting two or more fields that, when combined, have a unique value across the two or more fields for each set of values. This approach is advantageous because it allows one to use an aspect of the invention to recognize row concepts based on combinations of named columns.

In another aspect, selecting includes selecting two or more categories, where the categories include an identifier field with a unique value in the identifier field for each category for each set of values, grouping the selected categories and using the grouped categories as the concept representing the sets of values. This approach is advantageous because it allows one to use an aspect of the invention to achieve a more representative concept to be associated with the sets of values.

BRIEF DESCRIPTION OF THE DRAWINGS

FIGS. 3A and 3B are example datasets;

FIG. 5 is another example dataset; and

DETAILED DESCRIPTION

As noted above, systems to date have had limited capabilities to convert tables into a form that can be used to respond to queries. Rather than producing multi-table data storage from the customers' data, a single table (usually within a columnar database) is produced, matching the user's original data, but with extra metadata describing what the system thinks the various columns represent.

In some embodiments, this is done for each column since the columns contain a label that is easy to look up in a classification system, as well as a set of data values that are usually representative of the concept of the column. As such the columns themselves become the query elements that can be matched to the user's questions in order to produce answers.

Unfortunately, columns are not the only elements of a dataset that have meaning. Whereas the columns typically represent attributes of something (like age, gender or salary), the rows represent the instances of that thing (like person 1 or person 2). Although a human being typically understands intuitively what the row represents for a given dataset, it is very difficult for a software system to classify it and expose it as a query element. This is partly because the rows do not contain any label or identifier that can be looked up in a classification tool. Furthermore, the rows represent a collection of values (for each column) that describe the instance, but each value in the row is often of a completely different type. As such, the rows are not classified as part of the query-able elements in the automatically generated model since the system cannot accurately classify them. If the user really needs them, they have to go and edit the original dataset by adding a row identifier as a separate column, and then re-import the dataset, leading to a less than ideal experience.

Figure 1:
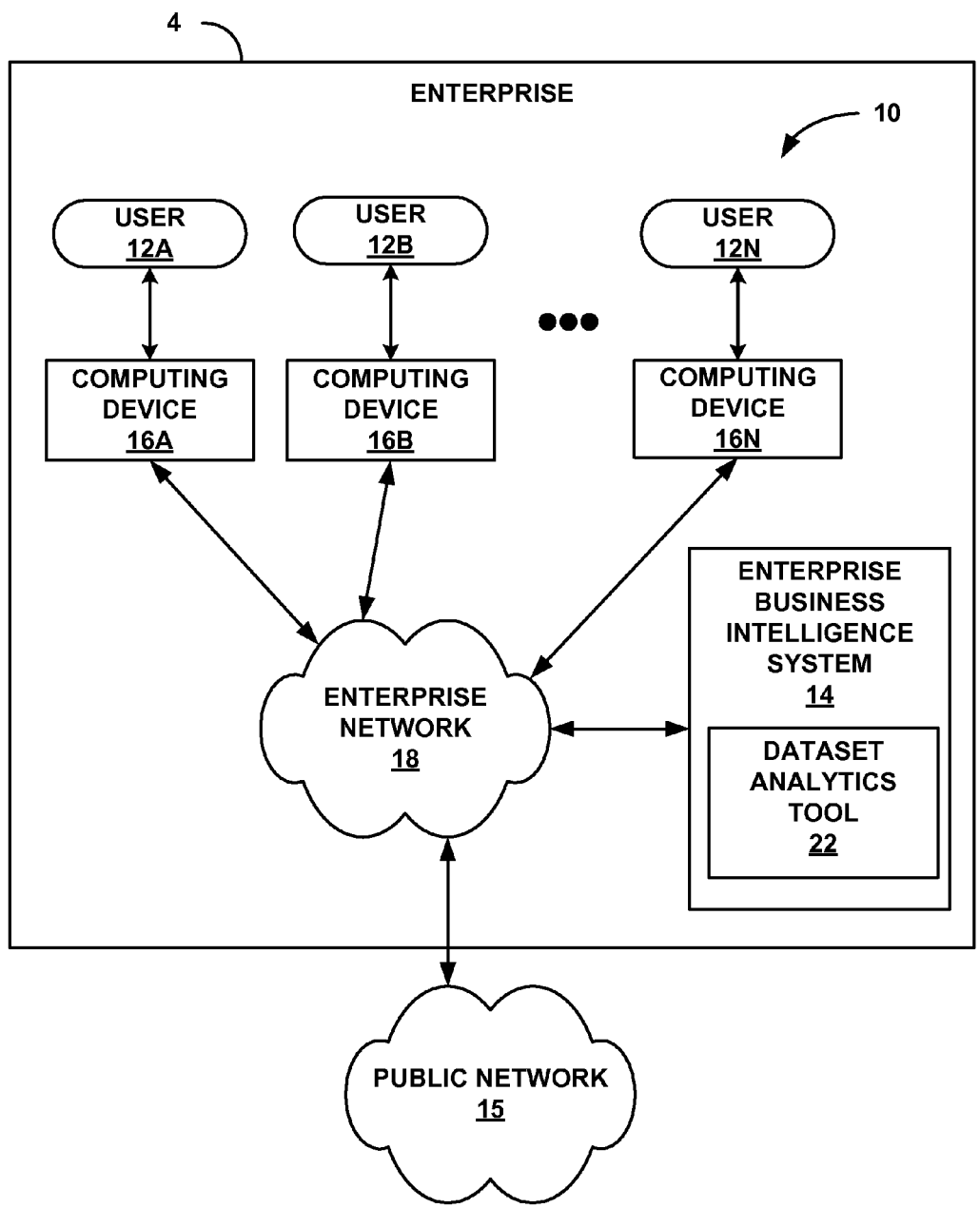
FIG. 1 is an example enterprise business intelligence system.

FIG. 1 illustrates one example embodiment of an enterprise business intelligence system 14 which receives tabular data and determines a concept representing rows of the tabular data. In one such embodiment, the tabular data is expressed as a table having rows and columns, wherein columns define data in the table and rows represent a record of a specific data item. In one such embodiment, the columns are already assigned to categories.

In traditional analytic systems, there is a modeling phase where an experienced modeler would have specifically exposed the rows (if they have meaning in the data) as an element in the model, often by adding a derived attribute. But this is done by a person who understands the data they are modeling. This modeling step takes time. Systems 14 like that shown in FIG. 1 do away with the modeling step, or at least make it optional, to improve time to value for the user.

In one embodiment, system 14 receives tabular data and identifies uniquely identified categories. The uniquely identified categories include one or more attributes that uniquely identify the category. System 14 then eliminates any uniquely identified category that does not have a unique value for each row in the category and selects one of the remaining uniquely identified categories as a concept representing the rows.

In one example embodiment, tabular data received by system 14 is analyzed and the columns are placed into categories before the categories are reviewed to determine a concept that represents the rows of the table.

FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In accordance with aspects of the present disclosure, enterprise business intelligence system 14 may receive a natural language query. Business intelligence system 14 may determine, based on the natural language query, a set of search criteria. Business intelligence system 14 may determine, from a plurality of data sets stored in one or more storage devices, one or more data sets that are relevant to the natural language query based at least in part on matches between the set of search criteria and attributes of the plurality of data sets.

Figure 2:
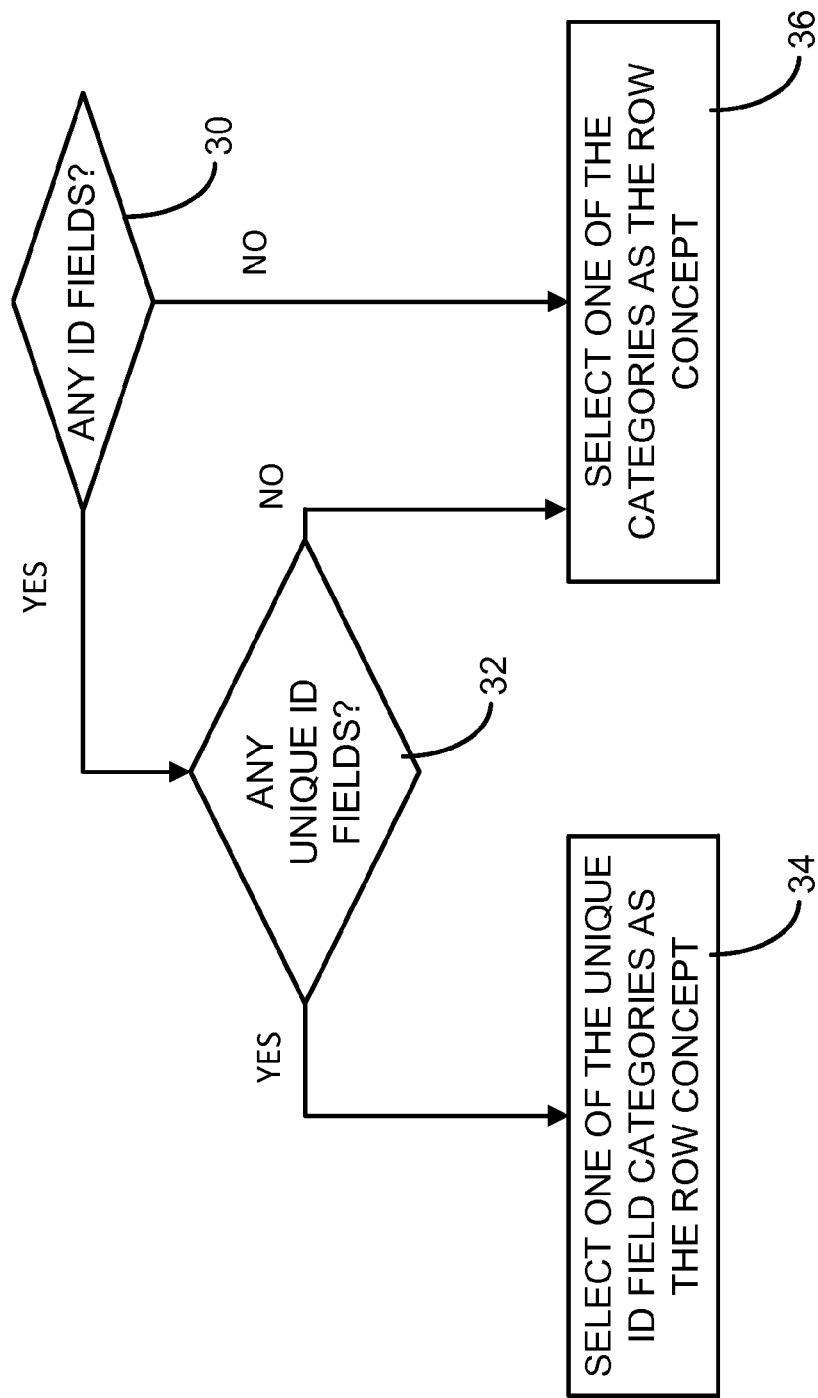
FIG. 2 is an example method of identifying row concepts in the system of FIG. 1.

FIG. 2 illustrates an example method of identifying row concepts in the system of FIG. 1. In the example embodiment of FIG. 2, system 14 attempts to discern the nature of the rows of a dataset based on an existing classification of the columns in the dataset. System 14 then adds a new derived column to the dataset with a set of generated row ids, but associates it to the concept that it found to be representative of rows. It's easy to simply add the extra column, but that column has no use if it cannot be classified appropriately such that it can be tied to the appropriate questions. The value of this approach is that it allows that classification to be done by the system automatically, and does not require a modeler or other end user intervention, therefore producing a better zero modelling experience for a user.

In one embodiment, a tool is used to classify the columns based on their labels and, in some cases, on a sampling of the data within the columns. In some such embodiments, these tools will also perform very light weight grouping of the columns by identifying basic hierarchies and category—attribute associations. One such tool is described in U.S. patent application Ser. No. 13/844,612, filed Mar. 15, 2013, which describes methods of classifying data items having headings into categories, including identifying lexical clues associated with data item heading, and mapping the data item headings to concepts based on a business ontology. These descriptions are incorporated herein by reference.

Such tools, however, only classify columns in the dataset, and do not infer the meaning of the rows of a dataset. In contrast, system 14 determines the nature of each row in a tabular dataset. In some embodiments, this involves adding another column to the dataset to capture the derived attribute. In some such embodiments, this further involves not only identifying the meaning to attribute to the rows but also determining whether to add a column to capture the derived attributes, so that the derived attribute can then be matched against question terms, or labeled meaningfully in the interface of the product.

In the example shown below, the datasets are shown as tabular data having named columns and unnamed rows. It should be apparent that other datasets are contemplated as well. Basically, system 14 can analyze any dataset that includes data organized as a plurality of named fields (here, columns) and as two or more sets of values (here, rows) associated with the named fields. In some embodiments, the dataset includes information detailing how each named field is assigned to a category.

In one example embodiment, as shown in FIG. 2, at 30, system 14 determines, for each category, whether there is at least one identifier field for that category, wherein each identifier field is a named field that acts as an identifier for that category. If there are none, control moves to 36, and system 14 selects one of the categories to serve as the concept representing the sets of values. Otherwise, control moves to 32.

At 32, system 14 identifies, for each category, identifier fields, if any, for that category that have a unique value in the identifier field for that category for each set of values. If so, control moves to 34 and, at 34, system 14 selects one or more of the categories with unique identifier fields as a concept representing the sets of values. Otherwise, control moves to 36.

Figures 3A, 3B:
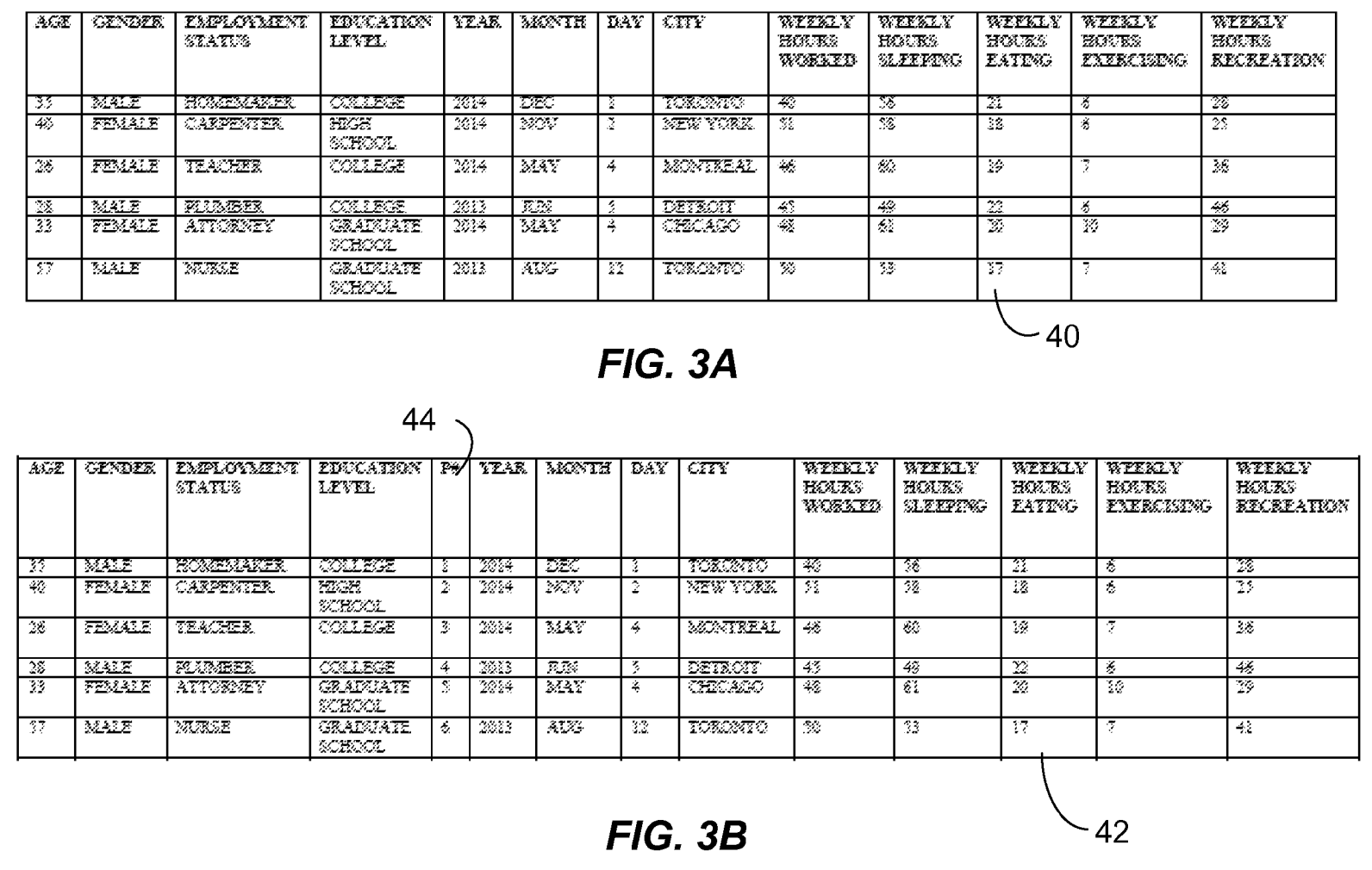

An example dataset is shown in FIG. 3A. In the example shown in FIG. 3a, dataset 40 is a subset of the American Time Use Survey. It contains information about how people typically spend their time. The term "person" or "people" is not present in the dataset. However, since a human intuitively knows that if it's a dataset about how people spend their time, they would know that each row represents a responder to the survey (or a person).

In one experiment, an outside party submitted a set of questions directed to the dataset. About 20% of the questions contained the word "person" or "people," because it is natural to ask such questions. To correctly answer such questions via a computer, however, requires additional information. In one embodiment, as shown in FIG. 3B, system 14 adds a row level element in the dataset model that correctly tags the set of values as representing a person. It can then link that element back to the question and produce an answer. Before associating the rows of values with a descriptive concept, system 14 could not answer any of the questions relating to people or persons, since the items simply were not in the model. As a result system 14 simply could not produce any reasonable combination of query elements it had available to answer those questions.

As shown in FIG. 3B, system 14 modifies dataset 40 to add a newly derived column 44 that represent the concept of "person". New dataset 42 includes column 44, a set of generated row IDs, and associates it to the concept that it found to be representative of rows. It's easy to simply add the extra column, but that column has no use if it cannot be classified appropriately such that it can be tied to the appropriate questions. The value of the approach described above is that it allows that classification to be done by system 14 automatically, and does not require a modeler or other end user intervention. The result is a better experience for the user.

Figure 4:
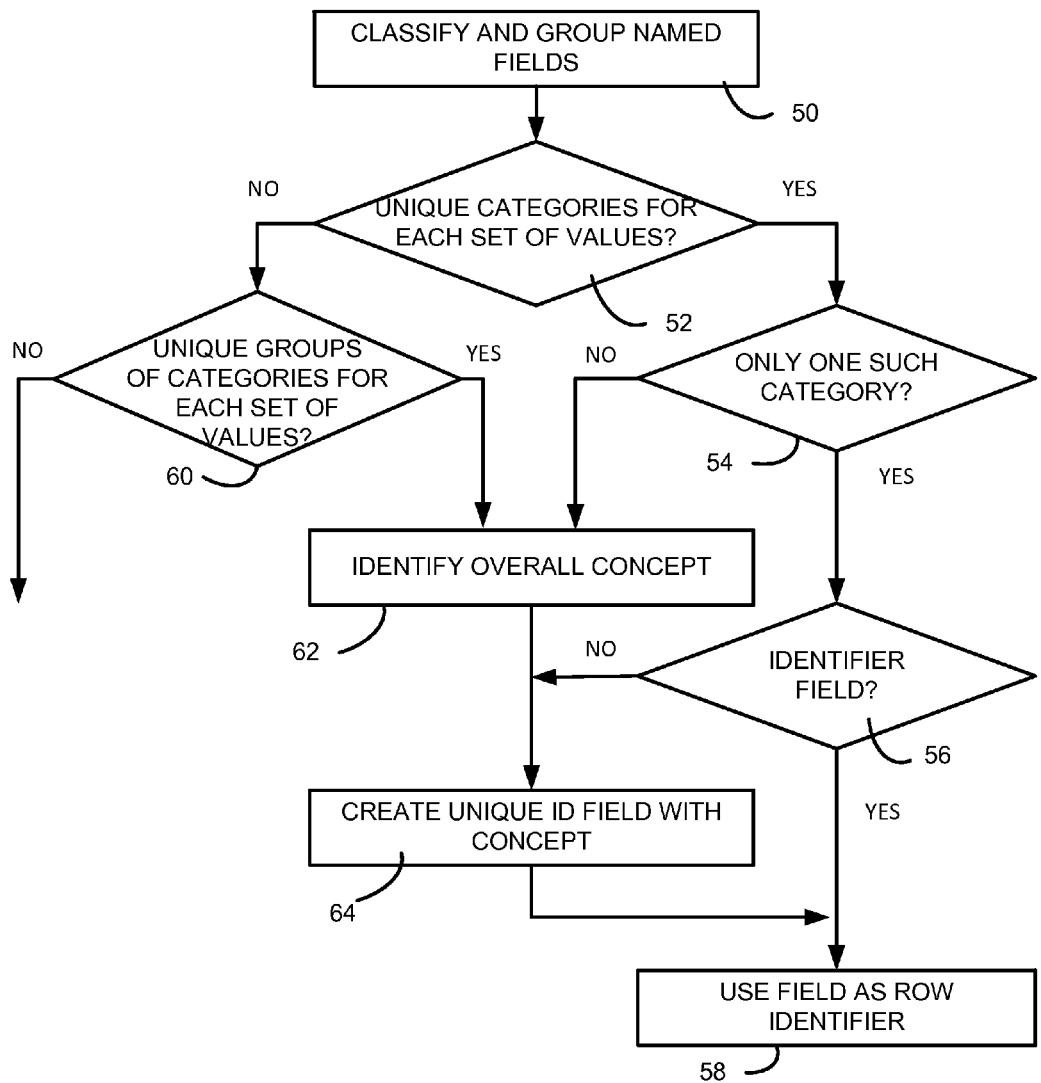
FIG. 4 is another example method of identifying row concepts in the system of FIG. 1.

A more detailed example embodiment of a method of labeling sets of values such as rows with information derived from named fields is shown in FIG. 4. In the example embodiment of FIG. 4, categories are identified at 30. In some embodiments, columns are categorized via tools such as those described in U.S. patent application Ser. No. 13/844,612, filed Mar. 15, 2013.

At 50, system 14 associates named fields with categories. In one embodiment, system 14 classifies the columns in the dataset and identifies lexical clues according to its ontology, when various columns in the dataset really represent attributes of a categorical concept.

In the dataset shown in FIG. 3A, the named fields include:
Age
Gender
Employment Status
Education Level
Year
Month
City Weekly hours worked
Weekly hours sleeping
Weekly hours eating
Weekly hours exercising
Weekly hours recreation In one example embodiment, as shown at 50 in FIG. 4, system 14 classifies and groups the named fields as:

Person (Category—cPerson)
   Age (Attribute—cAge)
   Gender (Attribute—cGender)
   Employment Status (Attribute—cEmployment)
   Education Level (Attribute—cEducation)
Date (Category—cDate)
   Year (Attribute—cYear)
   Month (Attribute—cMonth)
   Day (Attribute—cDay)
City (Attribute—cLocation)
Weekly hours worked (Metric—cDuration)
Weekly hours sleeping (Metric—cDuration)
Weekly hours eating (Metric—cDuration)
Weekly hours exercising (Metric—cDuration)
Weekly hours recreation (Metric—cDuration)

As is shown above, system 14 groups the attributes of a person, recognizes that these are all representative of person (using its ontology), and adds a categorical grouping in the model to group those attributes together. It's important to note that although these are grouped under person, person cannot be used in a query, since there is no associated column in the dataset to run the query against (unless system 14 could identify one of the items as an identifier of the attribute "person", which isn't the case here).

In this example embodiment, this grouping mechanism merely helps system 14 to understand that the attributes beneath it are related. Also system 14 was able to do the same with year, month and day (and likely create a hierarchy from them). In fact, many such groups can be identified within the set of columns of a typical dataset. (This example is extremely simplistic.)

If one looks at the model above, however, one still cannot tell what the row represents. The dataset still is just a set of attributes, a few of which have been grouped into categories, and some measures.

At 52, system 12 begins to apply a set of elimination steps to remove noise and focus on the important attributes for identifying the underlying concept of the rows. First, at 52, system 14 identifies, within each category, whether there is an attribute (or combination) that uniquely identifies the category. In some example embodiments (such as Watson Analytics), the Ontology Knowledge base (in this case, within SMD) has this knowledge and can be used. For example, in this case Person has no such attribute in dataset 40 as each of its associated attributes cannot uniquely identify the Person. However, the attributes Year/Month/Day do uniquely identify the Date category.

Next, at 54, eliminate any category that has a unique identifier, but does not have a unique value for each one. In the example dataset of FIG. 3A, the attribute "City" is in its own category and is eliminated because there is not a unique value for each row in dataset 40. If no categories remain, go to 60. System 14 should now be left with only categories, and single attributes that have unique values for each row.

In some example embodiments, the check at 52 eliminates any category that has a unique identifier attribute (or set of attributes), but does not have a unique value for each one (or combination). In this case the Year/Month/Day Combination would not be unique so Date is eliminated as well as Year/Month/Day from consideration.

In the example shown in FIG. 3A, however, at check at 52, leaves one remaining category—"person". Control moves to 54, where a check is made at 54 to determine if there is more than one category remaining that has an attribute that uniquely identifies the category and has unique values for each entry in the set of values. If not (as in this example), control moves to 56 and the category "person" is examined for an identifier field. (In this example there is no identifier field.) Control then moves to 64, where a unique identifier field (person identifier 44 in dataset 42 as shown in FIG. 3B) is created and then used at 58.

If, at 56, there is more than one category remaining that has an attribute that uniquely identifies the category and has unique values for each entry in the set of values, control moves to 62 and the remaining categories are examined to see if they can be grouped or should combined into a higher level concept. In one such embodiment, using the remaining categories, system 14 iteratively moves up the Ontology to see if it can further group these into a common grouping. (This example does not have this case as all that is left is cPerson, but see examples of this in the movies dataset of this FIG. 5 below). Such an approach may allow us to find a more general concept that includes all or most of the concepts that are left which can be use as the row level concept, which can then be used. Control then moves to 64, where a unique identifier is created for the group or higher level concept and then used at 58.

At 60, a check is made to determine if there are a subset of categories that, when taken together, are unique for each set of values. In the example shown in FIG. 3A, the combination of Date and City provide such a unique set of values. In the event that no category survived at 52, the combination of Date and City in the example embodiment of FIG. 3A may serve as a possible concept. Control then moves to 62, where the combination of categories is examined to see if it can be grouped or should be combined into a higher level concept. Control then moves to 64, where a unique identifier is created for the group or higher level concept and then used at 58.

If, at 56 or 62, system 14 has a single concept left, it has found the concept representing rows. If no concept was found, the rows are not likely to be representative of anything which is true when the dataset contains aggregated data, or could represent a combination of concepts (For example a city and a date for weather data). This is ok, as it would not be meaningful to ask a row level question against these datasets.

If, however, system 14 has identified a unique concept that can be associated with the row, then system 14 can meaningfully associate rows to a question containing that concept. So a check is made again at 56 to see if one of the attributes associated with that category (or group of categories as at 62) is representative of an identifier for that category. If so, system 14 doesn't have to go any further since it has found an appropriate column that represents the rows. It can simply associate the concept found with that identifier column in the model.

As noted in the discussion of FIG. 4 above, if system 14 does not have an identifier column when checked at 56, it can create one, associate it with the appropriate category in the model and attach the appropriate concept. It will now be available both as a selectable query item in the system, and for matching to natural language questions. System 14 can safely do this because it has determined that this category is representative of the rows, so a unique identifier would represent a unique row identifier instance of that category. It is not safe to do this in general as categories that are not representative of rows are not likely to be unique across rows, and adding a unique row level identifier to that category would produce erroneous responses to questions. For example, in the case above, how many people should return a result that is the same as how many rows, but how many cities should not, since each row does not represent a unique city. Because of this, it is necessary to successfully determine which category in the dataset system 14 can create a unique id for.

As is shown in FIG. 3B, the model produced in this example dataset of FIG. 3A would be:
Person (Category—cPerson)
  Age (Attribute—cAge)
  Gender (Attribute—cGender)
  Employment Status (Attribute—cEmployment)
  Education Level (Attribute—cEducation)
  Person (Attribute—cIdentifier)
Date (Category—cDate)
  Year (Attribute—cYear)
  Month (Attribute—cMonth)
  Day (Attribute—cDay)
City (Attribute—cLocation)
Weekly hours worked (Metric—cDuration)
Weekly hours sleeping (Metric—cDuration)
Weekly hours eating (Metric—cDuration)
Weekly hours exercising (Metric—cDuration)
Weekly hours recreation (Metric—cDuration)

Note the added model item, which identifies person (cIdentifer—cPerson) and would be unique for each row of the dataset.

It is these steps described above which allows us to determine in a smart way what to add to the model so that rows can be used appropriately and with the appropriate concept. In this case the actual data in the Person column would likely be random unique keys, or, as shown in FIG. 3B, simply a rowId index. It can, however, still be meaningfully projected in a visualization since it would allow us to plot individual data points for each person, and label the axis of the visualization correctly.

In one embodiment, before the check is made at 52, the measures are removed. Since measures represent numerical measures of an attribute, they measure some aspect of the row, but don't identify what the row is. Categorical attributes categorize the row and are therefore more useful for identifying what the row is. So system 14 eliminates the measures from consideration.

With the big data revolution, the ability to derive concepts from data sets is paramount to make people become successful with their analysis. Currently, the vendors of data analysis are struggling with interpreting different data sets to allow for instant analysis. In many cases, some manual/human steps have to be added to include e.g. an extra column. This takes time, and with the approaches discussed above, system 14 is capable of deriving a human concept from a dataset.

The advantage of this approach is that semantic concept NOT explicitly shown in a data set is derived and is added to the data set, so other mechanisms can use that information to analyze the data set, without or with a significantly reduce amount of human intervention.

Another example dataset is shown in FIG. 5. In example dataset 70 of FIG. 5, system 14 identifies the concepts including Title, Year, Season, Studio, Genre, as well as Box Office Average, Budget, Profit. To help reduce the potential matches in the generalization process, any generic concepts will first be excluded. In the above example, Year, Season as well as Budget and Profit will not be part of the selection.

Notice that, in some embodiments, the selection and generalization process are iterative and can be applied multiple times in order to refined the results. In the first iteration of this process, system 14 will exclude any metric concepts as well, because the category concepts are generally more representative for the detail row data within a dataset. The metric concepts will be used as refinement concepts in later iterations.

As a result, the first selections of concepts are Title, Studio and Genre. During the second generalization step, these concepts will be used to search in external ontology database to find a higher level concept which all these identified concepts are associated with. As a simple example, the external ontology database could return a Video Game concept as a potential candidate, due to the following relationships:
Video Game has a Title.
Video Game is released by a Studio.
Video Game has a Genre.

Other potential candidates with similar relationships could include Film and TV Program. Since the goal is to identify one representative concept to describe the detail row level data, these candidates need to be further narrowed down. As an iterative process, more concepts identified from the dataset could be used to refine the search result. Generic concepts such as Budget and Profit are common to different type of data, so system 14 will choose more specific concepts in the next refinement iteration. In this case, Rotten Tomatoes % and Box Office Avg are chosen to further refine the concepts. Out of the three candidates, only the concept Film has additional relationships with these two extra concepts. As a final result, the Film concept can be used to describe the detail row level data for this dataset.

In the above examples, the use of additional concepts is enough to refine the concepts down to a single one. In the case that additional concepts is not enough to narrow down the results, a sample data could be taken from the original dataset and used to look up from instances of these candidate concepts. For example, a sample value from the Title column could be used to cross reference with instances from Video Game, Film, and TV Program. If any of these concepts contain such instance, then it can be used as an evidence to refine the result.

Furthermore, if the above two refinement process still cannot give a single relatively confidence concept to describe the dataset, we can use the ancestry information from the ontology to find a common parent of all the candidate concepts. In the above example, the common parent of Film, TV Program, and Video Game could be the generic concept Work of Art.

The last step of this process is validating against the original dataset and finalizing the result. In the example given above, the process identified Film as the best concept representing the rows of the datasets. However, the primary key of this dataset, the Title column is also a primary attribute of the Film concept. In this case, system 14 could pick the Title column to represent the Film concept. In case that the dataset doesn't contain a primary key column which could be used to represent the identified concept, a Row ID column could be artificially created and used. Other validation could include cross reference the instances of the concepts from the external ontology with what's in the original dataset to further confirm the result.

In one example embodiment, in the event that no categories contain identifier fields, system 14 selects two or more fields, where the combination of fields is a unique representation of the sets of values.

In one example embodiment, in the event that one category contains identifier fields and one of the identifier fields has unique values for each set of values, system 14 uses the category as the concept.

In one example embodiment, in the event that one category has two or more identifier fields, but none of the identifier fields has unique values for each set of values, but two or more of the identifier fields in that category, when combined, have unique values across all sets of values, system 14 uses the category as the concept.

In one example embodiment, in the event that two or more categories have an identifier field and only one identifier field (e.g., category B) has unique values for each set of values: Use category B as the concept.

In one example embodiment, in the event that two or more categories have an identifier field and two or more identifier fields (e.g., categories B and C) have unique values for each set of values: Group all categories that have identifier fields with unique values (e.g., B and C) and use as the concept. (Case 4 is a subset of 5)

In one example embodiment, in the event that two or more categories have an identifier field, no identifier fields have unique values across all sets of values, but two or more identifier fields in different categories (e.g., categories A and C), when combined, have unique values across all sets of values: Use the combined A and C as the concept.

In one example embodiment, in the event that one or more categories has no identifier field while two or more categories have an identifier field, but no identifier fields have unique values across all sets of values, and no combination of two or more identifier fields, when combined, has unique values across all sets of values: Use one or more of the categories that does not have an identifier field as the concept.

Figure 6:
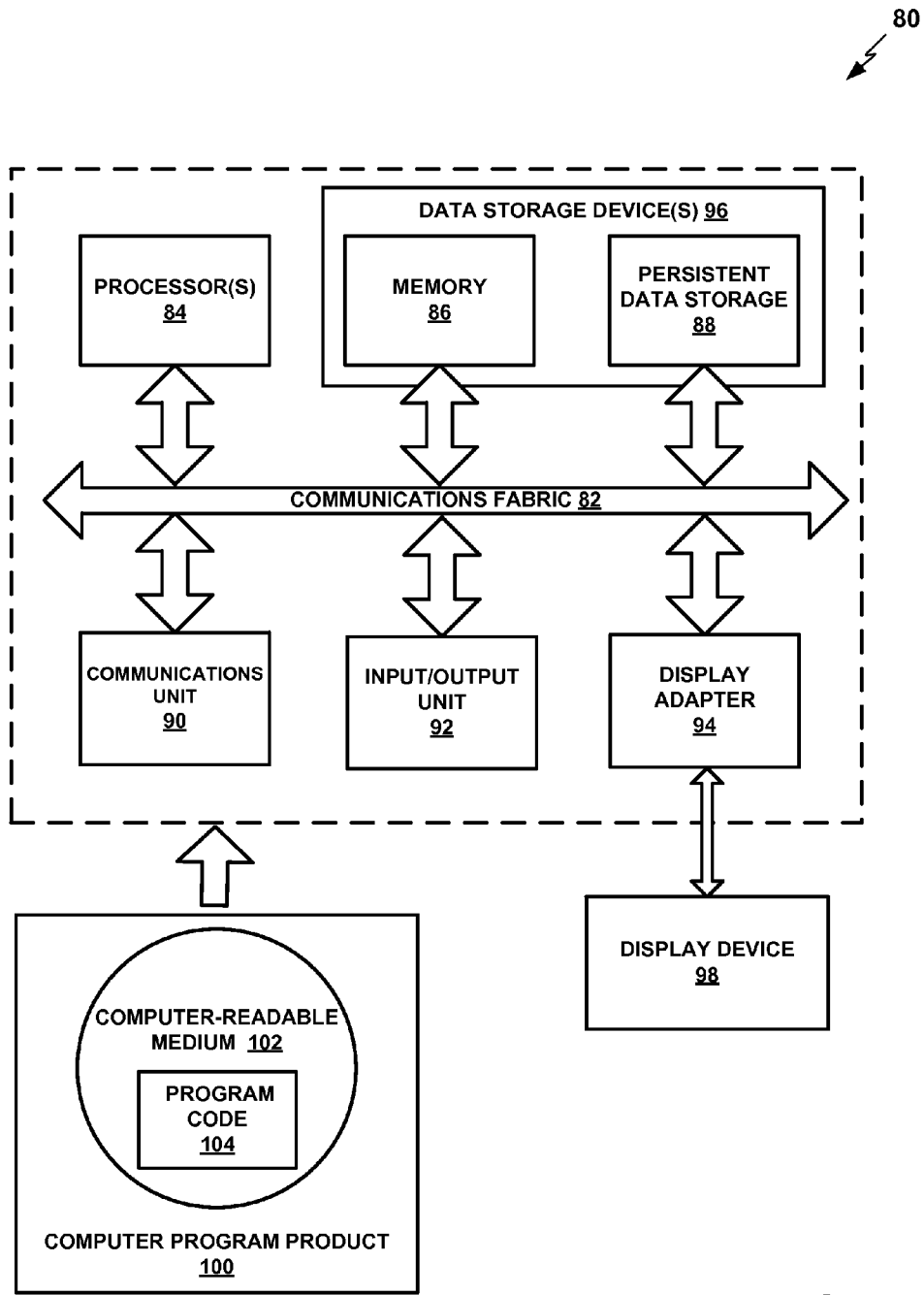
FIG. 6 illustrates an example computing system.

FIG. 6 is a block diagram of a computing device 80 that may be used to execute a dataset analytics tool 22, according to an illustrative example. Computing device 80 may be, for example, a server. Computing device 80 may also be any server for providing an enterprise business intelligence application, including a virtual server, that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 6, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type.

Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a dataset analytics tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hardline or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for comparative peer analysis for business intelligence (BI), the computer program product comprising a computer-readable storage medium having program code embodied therewith, the program code executable by at least one processing device to:
   receive data, wherein the data is organized as a plurality of named fields, wherein each named field includes a set of values associated with the named field, wherein each named field is assigned to a category from a plurality of categories and wherein each set of values includes two or more entries;
   determine, for at least one category, whether there is at least one identifier field for that category, wherein each identifier field is a named field that acts as an identifier for that category; and
   select a concept, wherein selecting the concept includes:
      determining whether one of the categories includes an identifier field that has a unique value for each entry in the identifier field set of values and, if so, selecting the identifier field as the concept;
      if none of the categories include an identifier field that has a unique value for each entry in the identifier field set of values, determining whether one of the categories includes two or more identifier fields that, when combined, have a unique value for each entry in the combined identifier field set of values and, if so, selecting the combined identifier fields as the concept and
      if none of the categories include an identifier field that has a unique value for each entry in the identifier field set of values and if none of the categories include two or more identifier fields that, when combined, have a unique value for each entry in the combined identifier field set of values, adding a new identifier field, wherein adding the new identifier field includes providing a unique value for each entry in set of values included in the new identifier field, associating the new identifier field with one of the categories, and selecting the new identifier field as the concept.

2. The computer program product of claim 1, wherein selecting the concept further includes:
   selecting two or more categories, wherein the categories include an identifier field with a unique value in the identifier field for each category for each entry in its set of values;
   grouping the selected categories; and
   using the grouped categories as the concept representing the sets of values.

3. The computer program product of claim 1, wherein selecting the concept further includes:
   selecting an identifier field in each of two or more categories that, when combined, has a unique value across the two or more identifier fields for each entry in its set of values; and
   combining the two or more categories with the selected identifier fields as the concept representing the sets of values.

4. The computer program product of claim 1, wherein adding a new identifier field includes inserting a unique value in that field for each entry of the set of values.

5. A system comprising:
   a network;
   a business intelligence system; and
   one or more computing devices connected through the network to the business intelligence system;
   wherein the business intelligence system receives data, wherein the data is organized as a plurality of named fields, wherein each named field includes a set of values associated with the named field, wherein each named field is assigned to a category from a plurality of categories and wherein each set of values includes two or more entries; and
   wherein the business intelligence system includes a dataset analytics tool, wherein the dataset analytics tool:
      receives the data;
      determines, for at least one category, whether there is at least one identifier field for that category, wherein each identifier field is a named field that acts as an identifier for that category; and
      selects a concept, wherein selecting the concept includes:
         determining whether one of the categories includes an identifier field that has a unique value for each entry in the identifier field set of values and, if so, selecting the identifier field as the concept;
         if none of the categories include an identifier field that has a unique value for each entry in the identifier field set of values, determining whether one of the categories includes two or more identifier fields that, when combined, have a unique value for each entry in the combined identifier field set of values and, if so, selecting the combined identifier fields as the concept; and
         if none of the categories include an identifier field that has a unique value for each entry in the identifier field set of values and if none of the categories include two or more identifier fields that, when combined, have a unique value for each entry in the combined identifier field set of values, adding a new identifier field, wherein adding the new identifier field includes providing a unique value for each entry in set of values included in the new identifier field, associating the new identifier field with one of the categories, and selecting the new identifier field as the concept.

6. The system of claim 5, wherein the data is organized as a table, wherein the named fields are columns and the sets of values are rows; and
   wherein selecting the concept further includes selecting a category that includes an identifier field with a unique value in the identifier field for that category for each set of values.

7. The system of claim 5, wherein selecting the concept further includes selecting two or more fields that, when combined, have a unique value across the two or more fields for each set of values.

8. The system of claim 5, wherein selecting the concept further includes:
   selecting two or more categories, wherein the categories include an identifier field with a unique value in the identifier field for each category for each set of values; and
   grouping the selected categories; and
   using the grouped categories as the concept representing the sets of values.

9. The system of claim 5, wherein adding a new identifier field includes inserting a unique value in that field for each entry of the set of values.

\* \* \* \* \*